US010064123B2

(12) United States Patent
Bari

(10) Patent No.: US 10,064,123 B2
(45) Date of Patent: Aug. 28, 2018

(54) WI-FI AND CELLULAR INTERWORKING FOR INTERNET OF THINGS DEVICES

(71) Applicant: AT&T Intellectual Property I, L.P., Atlanta, GA (US)

(72) Inventor: Farooq Bari, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 172 days.

(21) Appl. No.: 14/755,388

(22) Filed: Jun. 30, 2015

(65) Prior Publication Data

US 2017/0006528 A1 Jan. 5, 2017

(51) Int. Cl.

| H04W 48/16 | (2009.01) |
|---|---|
| H04L 12/24 | (2006.01) |
| H04W 48/18 | (2009.01) |
| H04W 4/00 | (2018.01) |
| H04W 48/14 | (2009.01) |

(52) U.S. Cl.
CPC ......... *H04W 48/16* (2013.01); *H04L 41/0893* (2013.01); *H04W 4/00* (2013.01); *H04W 48/14* (2013.01); *H04W 48/18* (2013.01)

(58) Field of Classification Search
None
See application file for complete search history.

(56) References Cited

U.S. PATENT DOCUMENTS

| 9,021,139 B1 | 4/2015 | Kim et al. | |
|---|---|---|---|
| 9,565,192 B2* | 2/2017 | Chillappa | H04L 63/102 |
| 2011/0176528 A1 | 7/2011 | Lu et al. | |
| 2013/0135115 A1* | 5/2013 | Johnson | G08C 19/00 |
| | | | 340/870.02 |
| 2013/0142118 A1 | 6/2013 | Cherian et al. | |
| 2013/0212236 A1 | 8/2013 | Foti et al. | |
| 2014/0032413 A1* | 1/2014 | Low | G06Q 20/327 |
| | | | 705/44 |
| 2014/0235244 A1 | 8/2014 | Hinman | |

(Continued)

OTHER PUBLICATIONS

Ha et al, SNAIL gateway: Dual-mode wireless access points for WiFi and IP-based wireless sensor networks in the internet of things, Jan. 14-17, 2012 , IEEE, 5 pages, 169-173.*

(Continued)

*Primary Examiner* — Mounir Moutaouakil
(74) *Attorney, Agent, or Firm* — Hartman & Citrin LLC

(57) ABSTRACT

Concepts and technologies described herein relate to WI-FI and cellular interworking for Internet of Things ("IoT") devices. According to one aspect disclosed herein, a radio access technology selection system can generate a policy for network selection. The policy can include network selection criteria for network selection to be performed by a dual-mode IoT device. The radio access technology selection system also can provision the policy for the dual-mode IoT device. The dual-mode IoT device can utilize the policy to select one or more networks over which to communicate IoT data. The radio access technology selection system can be or can include an access network discovery and selection function ("ANDSF"). The ANDSF can utilize an ANDSF management object ("MO") tree to implement an MO defined specifically for the network selection criteria for the IoT device.

18 Claims, 6 Drawing Sheets

(56) References Cited

U.S. PATENT DOCUMENTS

| | | | |
|---|---|---|---|
| 2014/0324973 A1* | 10/2014 | Goel | H04W 4/70 709/204 |
| 2015/0006719 A1 | 1/2015 | Gupta et al. | |
| 2015/0007273 A1* | 1/2015 | Lin | H04L 63/08 726/4 |
| 2015/0026317 A1 | 1/2015 | Ilsar et al. | |
| 2015/0142968 A1 | 5/2015 | Bhagwat et al. | |
| 2015/0109995 A1 | 8/2015 | Mathai et al. | |
| 2016/0080995 A1* | 3/2016 | Singh | H04W 36/14 370/331 |
| 2016/0127889 A1* | 5/2016 | Cui | H04W 36/08 370/328 |
| 2016/0345279 A1* | 11/2016 | Gunnarsson | H04W 4/005 |
| 2016/0366586 A1* | 12/2016 | Gross | H04W 12/06 |
| 2016/0381030 A1* | 12/2016 | Chillappa | H04L 63/102 726/11 |
| 2016/0381615 A1* | 12/2016 | Nagaraja | H04W 36/0083 455/436 |
| 2016/0381662 A1* | 12/2016 | Wang | H04W 76/022 370/329 |
| 2017/0070967 A1* | 3/2017 | Wang | H04W 56/0005 |

OTHER PUBLICATIONS

Shelby, PMA Lightweight M2M Tutorial, May 19, 2013, https://www.slideshare.net/zdshelby/oma-lightweightm2-mtutorial, 19 slides.*

OMA Device Management Working Group, http://openmobilealliance.org/about-oma/work-program/device-management/.*

Mark Bartolomeo, Group Vice President, Verizon Connected Solutions—IoT "Internet of Things: Science Fiction or Business Fact?" (PDF). Harvard Business Review. Nov. 2014, 9 pages.*

Hazmi et al., "Feasibility Study of IEEE 802.11ah Radio Technology for IoT and M2M use Cases," Globecom Workshops, GC'12 Workshop: Second International Workshop on Machine-to-Machine Communications 'Key' to the Future Internet of Things, 2012, pp. 1687-1692, IEEE.

Husain et al., "Recent Trends in IoT/M2M related Standards," Tsp 4, 2014, S6m.

* cited by examiner

WI-FI AND CELLULAR INTERWORKING FOR INTERNET OF THINGS DEVICES

BACKGROUND

In recent years, mobile telecommunications carriers have experienced a dramatic increase in traffic on their networks, and this trend will likely continue. This increase in traffic has been caused in part by the increased adoption of smartphones and other devices that rely on mobile telecommunications networks, and the migration of many customers from utilizing landline telecommunication services to utilizing mobile telecommunication services for their communications needs. To meet the demands of higher traffic and to improve the end user experience, mobile telecommunications carriers are examining mechanisms by which to improve network efficiency, network capacity, and the end user experience, while keeping operational costs at a level conducive to maintaining competitive rates for the services they provide. One such mechanism is the use of WI-FI technologies to supplement existing cellular network infrastructure.

The internet of things ("IoT") is a concept of making physical objects, collectively "things," network addressable to facilitate interconnectivity for the exchange of data. Current cellular networks are not well-suited for many of the IoT verticals, especially the verticals that require low power and low cost. As a result, several non-cellular, low power, wide area ("LPWA") access technologies are being explored in the industry as an alternative to cellular. If such technologies are deployed, the result would be completely separate networks that would require independent deployment and operation. Currently, proponents of LPWA technologies are working on industry proposals for interworking with cellular technologies in order to reduce the overhead of deploying and operating independent networks.

SUMMARY

Concepts and technologies described herein relate to WI-FI and cellular interworking for internet of things ("IoT") devices. According to one aspect disclosed herein, a radio access technology ("RAT") selection system can generate a policy for network selection. The policy can include network selection criteria for network selection to be performed by a dual-mode IoT device. The radio access technology selection system also can provision the policy for the dual-mode IoT device. The dual-mode IoT device can utilize the policy to select one or more access networks over which to communicate IoT data.

In some embodiments, the radio access technology selection system can be or can include an access network discovery and selection function ("ANDSF"). The ANDSF can utilize an ANDSF management object ("MO") tree to implement an MO defined specifically for the network selection criteria for the IoT device. The MO can be provisioned with one or more WI-FI network identifiers that identify one or more WI-FI access networks. The WI-FI network identifier can identify the access network particularly as an IoT WI-FI network connected to an IoT gateway operating on or in communication with a core network, such as an evolved packet core ("EPC") network. In some embodiments, the IoT WI-FI network operates in accordance with Institute Electrical and Electronics Engineers ("IEEE") 802.11ah, IEEE 802.11af, or both IEEE 802.11 ah and IEEE 802.11 af, standards. The MO can be further provisioned with one or more access point names ("APNs") that identify one or more packet data networks ("PDNs") that the dual-mode IoT device should connect to via the WI-FI access network.

According to another aspect disclosed herein, an IoT device can receive an IoT network selection and traffic routing policy from a RAT selection system, such as described above. The IoT device can select and can attach to a network in accordance therewith.

In some embodiments, the IoT device can determine that a current state is no longer in accordance with the IoT policy. In response, the IoT device can select a different network in accordance with the IoT policy. For example, the IoT device might first select a WWAN cellular network and then later select a WWAN WI-FI network, or vice versa. Other examples include the IoT device selecting different access networks within the same technology type.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
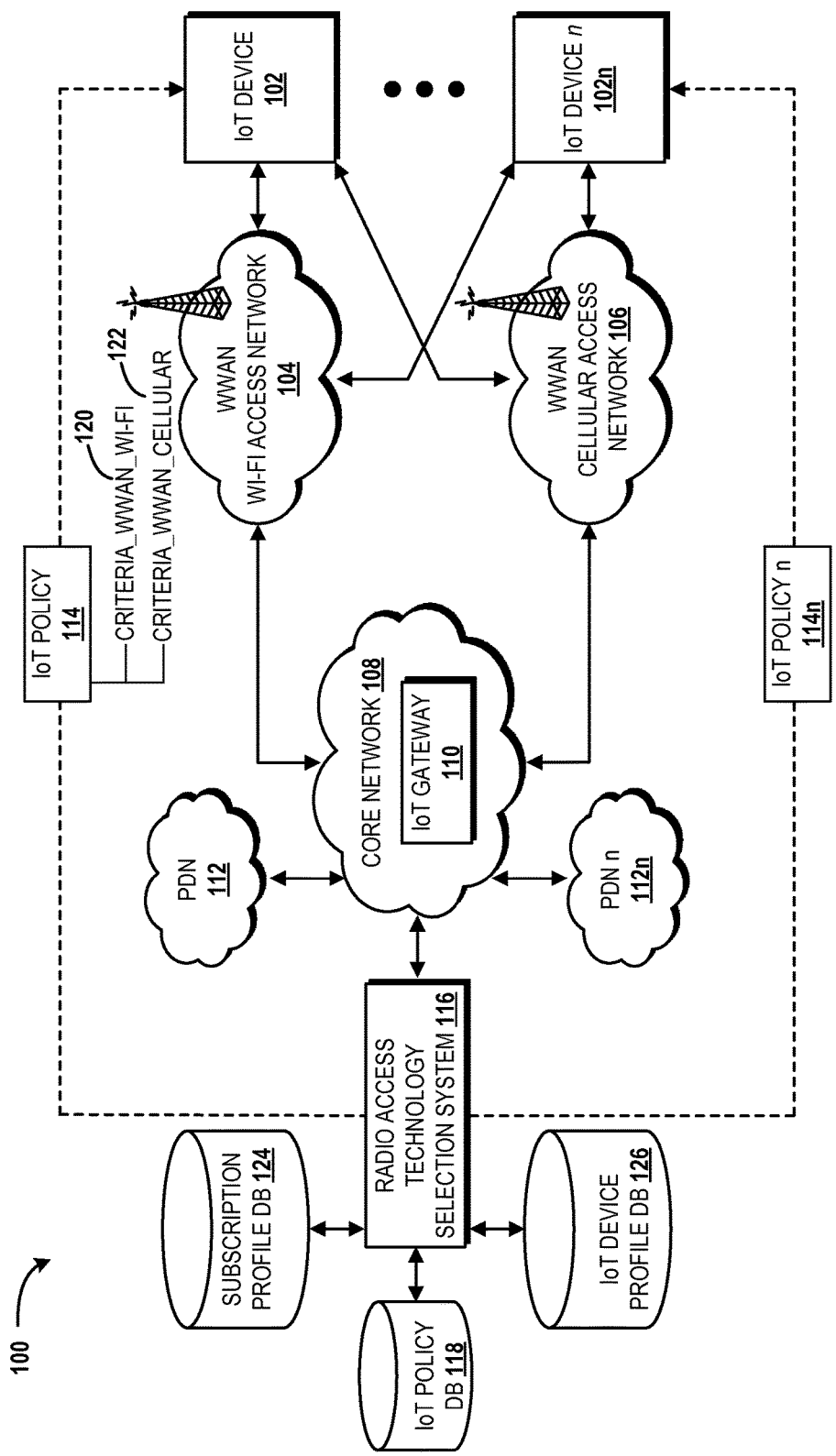
FIG. 1 is a block diagram illustrating aspects of an illustrative operating environment for various concepts disclosed herein.

Concepts and technologies described herein relate to WI-FI and cellular interworking for internet of things ("IoT") devices. More particularly, the concepts and technologies disclosed herein leverage existing and ongoing Third Generation Partnership Project ("3GPP") WI-FI interworking solutions for support of IoT devices. Traditional Institute Electrical and Electronics Engineers ("IEEE") 802.11 WI-FI technologies are personal area technologies and do not have wide area, low energy capabilities. However, IEEE 802.11ah operates below 1 gigahertz ("GHz") and has wider coverage. IEEE 802.11ah also has better energy consumption and therefore is better suited for IoT devices. Similarly, IEEE 802.11af works in television whitespaces and can also be considered for IoT devices. 3GPP solutions for interworking with WI-FI can be utilized to support IEEE 802.11 ah and 802.11 af wide area technologies to support IoT-related use cases as will be detailed herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system configurations, including hand-held devices, IoT devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of WI-FI and cellular interworking for IoT devices will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes IoT devices 102-102n that are each operating on and in communication with a wireless wide area network ("WWAN") WI-FI access network 104, a WWAN cellular access network 106, or both. The IoT devices 102-102n can be or can include any "thing" that can collect data and that is configured to be network addressable so as to connect to and communicate with one or more networks, such as the WWAN WI-FI access network 104 and/or the WWAN cellular access network 106, over which to communicate the data to other connected devices, including, for example, computers, smartphones, tablets, vehicles, other IoT devices, combinations thereof, and the like. The IoT devices 102-102n can be deployed for consumer use, business use, and can find application in many industry-specific use cases. For example, the IoT devices 102-102n may find at least partial application in the following industries: automotive, energy, healthcare, industrial, retail, and smart buildings/homes. Those skilled in the art will appreciate the applicability of IoT-solutions in other industries as well as consumer and business use cases. For this reason, the applications of the IoT devices 102-102n described herein are used merely to illustrate some examples and therefore should not be construed as being limiting in any way.

Although in the illustrated example the IoT devices 102-102n are shown as being in communication with one WWAN WI-FI access network (i.e., the WWAN WI-FI access network 104) and one WWAN cellular access network (i.e., the WWAN cellular access network 106) as dual-mode IoT devices, the IoT devices 102-102n may be in communication with any number of access networks, including networks that incorporate collocated WWAN WI-FI and cellular technologies, in essence merging the WWAN WI-FI access network 104 and the WWAN cellular access network 106.

Each of the access networks, including the WWAN WI-FI access network 104 and the WWAN cellular access network 106, can include one or more service areas (which may also be referred to herein as "cells") having the same or different cell sizes, which may be represented by different cell-types. As used herein, a "cell" refers to a geographical area that is served by one or more base stations operating within an access network. As used herein, a "base station" refers to a radio receiver and/or transmitter (collectively, transceiver) that is/are configured to provide a radio/air interface over which one or more IoT devices, such as the IoT devices 102-102n, can connect to a network. Accordingly, a base station is intended to encompass one or more base transceiver stations ("BTSs"), one or more Node-Bs, one or more eNode-Bs, one or more home eNode-Bs, one or more wireless access points ("APs"), one or more multi-standard metro cell ("MSMC") nodes, and/or other networking nodes or combinations thereof that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to and from one or more devices, such as the IoT devices 102-102n.

A cell-type can be associated with certain dimensional characteristics that define the effective radio range of a cell. A cell-type can additionally represent the radio access technology ("RAT") utilized by a cell. Cell-types can include, but are not limited to, a macro cell-type, a metro cell-type, a femto cell-type, a pico cell-type, a micro cell-type, WLAN cell-type, a MSMC cell-type, and a white space network cell-type. For ease of explanation, a "small cell" cell-type is utilized herein to collectively refer to a group of cell-types that includes femto cell-type (e.g., home eNodeB), pico cell-type, and micro cell-type, in general contrast to a macro cell-type, which offers a larger coverage area. Other cell-types, including proprietary cell-types, temporary cell-types, and ad-hoc cell-types are also contemplated. An ad-hoc cell-type, for example, can include an IoT device, such as the IoT devices 102-102n, functioning as a "hotspot" for facilitating connectivity for other devices, such as other IoT devices, to connect to another potentially larger cell.

The WWAN cellular access network 106 may operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other current 3GPP cellular technologies, other future 3GPP cellular technologies, combinations thereof, and/or the like. The WWAN cellular access network 106 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the IoT devices 102-102n. Data communications can be provided in part by the WWAN cellular access network 106 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the WWAN cellular access network 106 may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like. The WWAN WI-FI access network 104 can operated in accordance with IEEE 802.11ah, IEEE 802.11af, or IEEE 802.11ah and IEEE 802.11af, and like standards that support WAN WI-FI.

The WWAN WI-FI access network 104 and the WWAN cellular access network 106 can be part of one or more mobile telecommunications networks that, in addition to providing network access to the IoT devices 102-102n, provide data access to one or more mobile devices such as cellular smartphones and other cellular-enabled devices. As used herein, a mobile telecommunications network includes one or more radio access network ("RANs") (such as the WWAN WI-FI access network 104 and/or the WWAN cellular access network 106) and a WWAN, which may include one or more core networks 108, such as, for example, an evolved packet core ("EPC") network. The illustrated core network 108 includes an IoT gateway 110 that interconnects access points in the WWAN WI-FI access network 104 and the WWAN cellular access network 106 to the core network 108.

The core network 108 embodied as an EPC network can include a mobility management entity ("MME"), a serving gateway ("SGW"), a packet data network ("PDN") gateway ("PGW"), and a home subscriber server ("HSS"). The PDN gateway interconnects the core network 108 and one or more external IP networks, shown in the illustrated embodiments as packet data networks ("PDNs") 112-112n. The PGW routes IP packets to and from the PDNs 112-112n. The PDN gateway also performs operations such as IP address/IP prefix allocation, policy control, and charging. In some implementations, the PGW and the SGW are combined. Moreover, the IoT gateway 110 functionality may be combined with the PGW and/or the SGW. The HSS is a database that contains user/subscriber information. The HSS also performs operations to support mobility management, call and session setup, user authentication, and access authorization. These concepts can be extended, as applicable, to the IoT devices 102-102n, or alternatively, a dedicated server for IoT devices can be implemented within the core network 108 to handle authentication, authorization, accounting, and/or other aspects.

The IoT devices 102-102n can receive one or more IoT policies 114-114n from a RAT selection system 116. The RAT selection system 116 can define/generate the IoT policies 114-114n. Alternatively, another system, such as a server computer, can be configured to generate the IoT policies 114-114n. After the IoT policies 114-114n are generated, the IoT policies 114-114n can be stored in an IoT policy database 118. When a new IoT device attaches to an access network, for example, during a registration process, the RAT selection system 116 can obtain an applicable IoT policy 114-114n from the IoT policy database 118. The RAT selection system 116 can utilize the obtained IoT policy 114-114n for the duration of service of the new IoT device, or can modify the IoT policy 114-114n as appropriate based upon network selection criteria established by or for an administrator of the new IoT device, an operator of at least a portion of the WWAN WI-FI access network 104, an operator of at least a portion of the WWAN cellular access network 106, or any combination thereof. As such, the IoT policies 114-114n can be dynamic.

As used herein, the term "policy," such as the IoT policies 114-114n, refers to one or more settings, one or more configurations, one or more rules, and/or the like that define, at least in part, one or more methods of action in light of one or more conditions to be used in a determination made by the IoT devices 102-102n regarding to which access network(s) to connect. In the illustrated embodiment, the IoT policies 114-114n can include network selection criteria for selecting a WWAN WI-FI access network, such as the WWAN WI-FI access network 104 (illustrated as "CRITERIA_WWAN_WI-FI 120") and network selection criteria for selecting a WWAN cellular access network, such as the WWAN cellular access network 106 (illustrated as "CRITERIA_WWAN_CELLULAR 122"), in addition to traffic routing instructions for routing IoT traffic through the access networks to one or more of the PDNs 112.

In some embodiments, the RAT selection system 116 is or includes an access network discovery and selection function ("ANDSF") that operates within or in communication with the core network 108. In these embodiments, the IoT policies 114-114n can be defined through an ANDSF management object ("MO") tree. The ANDSF MO tree can include a plurality of MOs, including an IoT MO to identify the access network(s) an IoT device, such as the IoT devices 102-102n, should connect to based, at least in part, upon criteria such as the CRITERIA_WWAN_WI-FI 120 and CRITERIA_WWAN_CELLULAR 122 and one or more network conditions at a given time. The ANDSF MO tree can include MOs that are compatible with Open Mobile Alliance ("OMA") Device Management ("DM") protocol specifications. Adding an IoT device specific MO to the ANDSF MO tree enables a more flexible policy-based dynamic intelligent network selection platform that allows IoT IP traffic to be routed to the best radio technology available. Moreover, adding an IoT device specific MO to the ANDSF MO tree helps ensure a robust policy-based network selection networks that serve traditional mobile devices, such as cellular smartphones, as well as IoT devices. The IoT device specific MO can be provisioned with one or more WI-FI network identifiers, such as one or more service set identifiers ("SSIDs") that identify, at least in part, one or more available WI-FI access networks, such as the WWAN_WI-FI access network 104. These identifiers can identify the Wi-FI access networks particularly as IoT networks. Furthermore, provisioning of an access point name ("APN") in the MO can identify one or more PDNs, such as one or more of the PDNs 112, for IoT use that the IoT device should connect to using one or more access networks, including WI-FI and/or cellular networks, such as the WWAN_WI-FI access network 104 and/or the WWAN cellular access network 106.

In some embodiments, the IoT policies 114-114n include one or more rules that specify one or more if-then conditions by which to handle a particular situation, such as redirecting network traffic based upon network load experienced by one or more of the access networks and reported to the IoT devices 102-102n, or in other embodiments, other devices, such as cellular smartphones, being served by the same access network or a portion thereof. In some other embodiments, the IoT policies 114-114n include one or more matrices of cause and effect conditions, tables of actions, or the like for responding to or otherwise dealing with certain stimuli, such as network conditions, user requests, and/or operator requests.

The IoT policies 114-114n can be stored in the IoT policy database 118. The IoT policy database 118 may be separate from and in communication with the RAT selection system 116 as in the illustrated embodiment. Alternatively, the IoT policy database 118 may be provided as part of or in communication with a separate policy server (not shown). In any case, the RAT selection system 116 can obtain the IoT policies 114-114n from the policy database 118 (either directly or through the policy server) in response to a request (e.g., from one or more of the IoT devices 102-102n) or in response to an event, such as a change to one or more of the IoT policies 114-114n. In some embodiments, the IoT policy database 118 is configured to provide the IoT policies 114-114n directly to the IoT devices 102-102n without interaction with the RAT selection system 116.

The RAT selection system 116 can also be in communication with or can include a subscription profile database 124. The subscription profile database 124 can store one or more subscription profiles for one or more administrators of the IoT devices 102-102n. As used herein, the term "subscription profile" refers to a collection of data associated with a subscription utilized by one or more devices such as the IoT devices 102-102n to access one or more access networks. A subscription profile can define information regarding a service agreement between a user and one or more service providers that provide telecommunications service, at least in part, via the WWAN WI-FI access network 104 and/or the WWAN cellular access network 106. The service agreement may include terms of service for pre-paid and/or post-paid service. The service agreement may include terms of roaming agreements between two or more mobile telecommunications carriers. The service agreement may define a service tier. A service tier may establish a priority for an IoT device in regard to utilizing network resources to connect to one or more of the access networks.

The RAT selection system 116 can also be in communication with or can include a IoT device profile database 126. The IoT device profile database 126 can store one or more IoT device profiles for the IoT devices 102-102n. As used herein, the term "IoT device profile" refers to a collection of data associated with one or more IoT devices such as the IoT devices 102-102n. In some embodiments, an IoT device profile includes, but is not limited to, a device name, device manufacturer, serial number, media access control ("MAC") address, international mobile equipment identity ("IMEI"), other device identifier, other network identifiers, combinations thereof, and the like.

In some embodiments, one or more of the IoT devices 102-102n are associated with multiple administrators. In these embodiments, the RAT selection system 116 (or another entity) can determine the correct subscription profile of the subscription profiles stored in the subscription profile database 124 for the active administrator of the IoT devices 102-102n and can utilize the correct subscription profile to select the correct policy for the active user of the IoT devices 102-102n.

It should be understood that some implementations of the operating environment 100 includes one IoT device 102, multiple WWAN WI-FI access networks 104, multiple WWAN cellular access networks 106, multiple core networks 108, multiple IoT gateways 110, multiple RAT selection systems 116, multiple IoT policy databases 118, multiple subscription profile databases 124, multiple IoT device profile databases 126. Moreover, the RAT selection system 116, the IoT policy database 118, the subscription profile database 124, the IoT device profile database 126, the IoT gateway 110, or some combination thereof may be provided as part of one or more distributed computing systems. Thus, the illustrated embodiment should be understood as being illustrative, and should not be construed as being limiting in any way.

Figure 2:
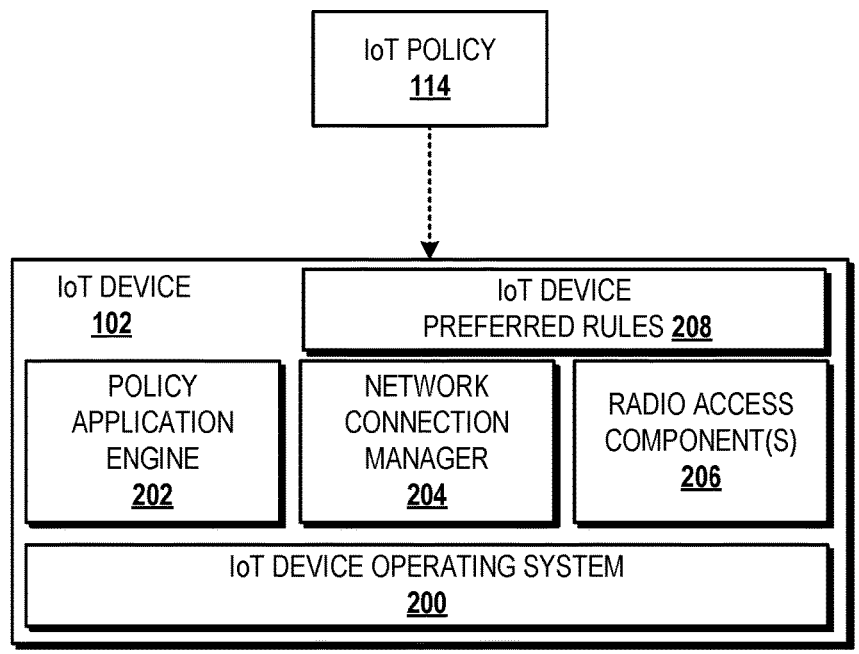
FIG. 2 is a block diagram illustrating aspects of an Internet of Things ("IoT") device, according to an illustrative embodiment.

Turning now to FIG. 2, a block diagram illustrating additional aspects of the IoT device 102 will be described, according to an illustrative embodiment. In the illustrated embodiment, the IoT device 102 receives the IoT policy 114 to be used in a determination regarding to which access network the IoT device 102 should connect, and more particularly, to either a WI-FI WWAN access network, such as the WWAN WI-FI access network 104, or to a cellular WWAN access network, such as the WWAN cellular access network 106. In addition to the IoT policies 114, the IoT device 102 can utilize other information, such as information sourced from the subscription profile database 124 and/or the IoT device profile database 126, in making the above determination.

The illustrated IoT device 102 includes an operating system 200, a policy application engine 202, a network connection manager 204, and one or more radio access components 206. The operating system 200 is a program for controlling the operation of the IoT device 102. The operating system 200 can include a proprietary operating system, an embedded operating system, a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The policy application engine 202 utilizes the IoT policy 114 alone, or in a combination with other information, such as obtained from the subscription profile database 124 and/or the IoT device profile database 126, to determine which of two or more available access networks the IoT device 102 should connect. In some embodiments, the policy application engine 202 is an application program that includes computer-executable instructions that, when executed by one or more processors of the IoT device 102, cause the IoT device 102 to analyze the IoT policy 114 alone, or in a combination with at least a portion of the other information, to instruct the IoT device 102, and more particularly, the network connection manager 204, to establish a connection to the selected access networks via the radio access component(s) 206.

The network connection manager 204 can manage all or a portion of the network connections available to the IoT device 102 at a given time. The network connections can include, for example, connections established via the radio access components 206, which may be or may include one or more WI-FI radios, one or more cellular radios, and/or other radios suited for the RATs described herein above. In some embodiments, the network connection manager 204 is included as part of the operating system 200 and/or another application stored on the IoT device 102, such as the policy application engine 202.

The IoT device 102 also can utilize one or more IoT device preferred rules 208 (which might be included in a subscription profile) regarding the selection of one or more of the access networks specified by or for the IoT device 102. For example, an IoT device preferred rule 208 may specify an override selection of a network that should be selected if the network is available. An override selection can be conditional. In some embodiments, the IoT device preferred rule(s) 208 are overridden by the IoT policy 114. In some other embodiments, the IoT device preferred rule(s) 208 override the IoT policy 114.

In some embodiments, the IoT device preferred rule(s) 208 can include IoT device administrator preferences. An IoT device administrator can provide one or more preferences, which can be considered along with other information disclosed herein when selecting one or more of the access networks. For example, an IoT device administrator might provide a preference that specifies the administrator's desire to have one or more IoT devices connect to a certain WI-FI network when multiple networks are available, including WLAN WI-FI networks such as at a home, work, and other private and/or public WLAN WI-FI networks. As another example, an IoT device administrator might provide a preference that specifies the administrator's desire to have one or more IoT devices connect to the access network RAN (e.g., free WWAN WI-FI versus paid cellular) available at all times or during one or more specified times. As another example, an IoT device administrator might provide a preference that specifies the administrator's desire to have one or more IoT devices connect to the access network that provides the highest throughput at all times or during one or more specified times, such as when the IoT device is scheduled to download a software and/or firmware update. As another example, an administrator might provide a preference that specifies the administrator's desire to have one or more IoT devices connect to the access network that will provide the most consistent experience. The above preferences can be combined in any way.

Figure 3:
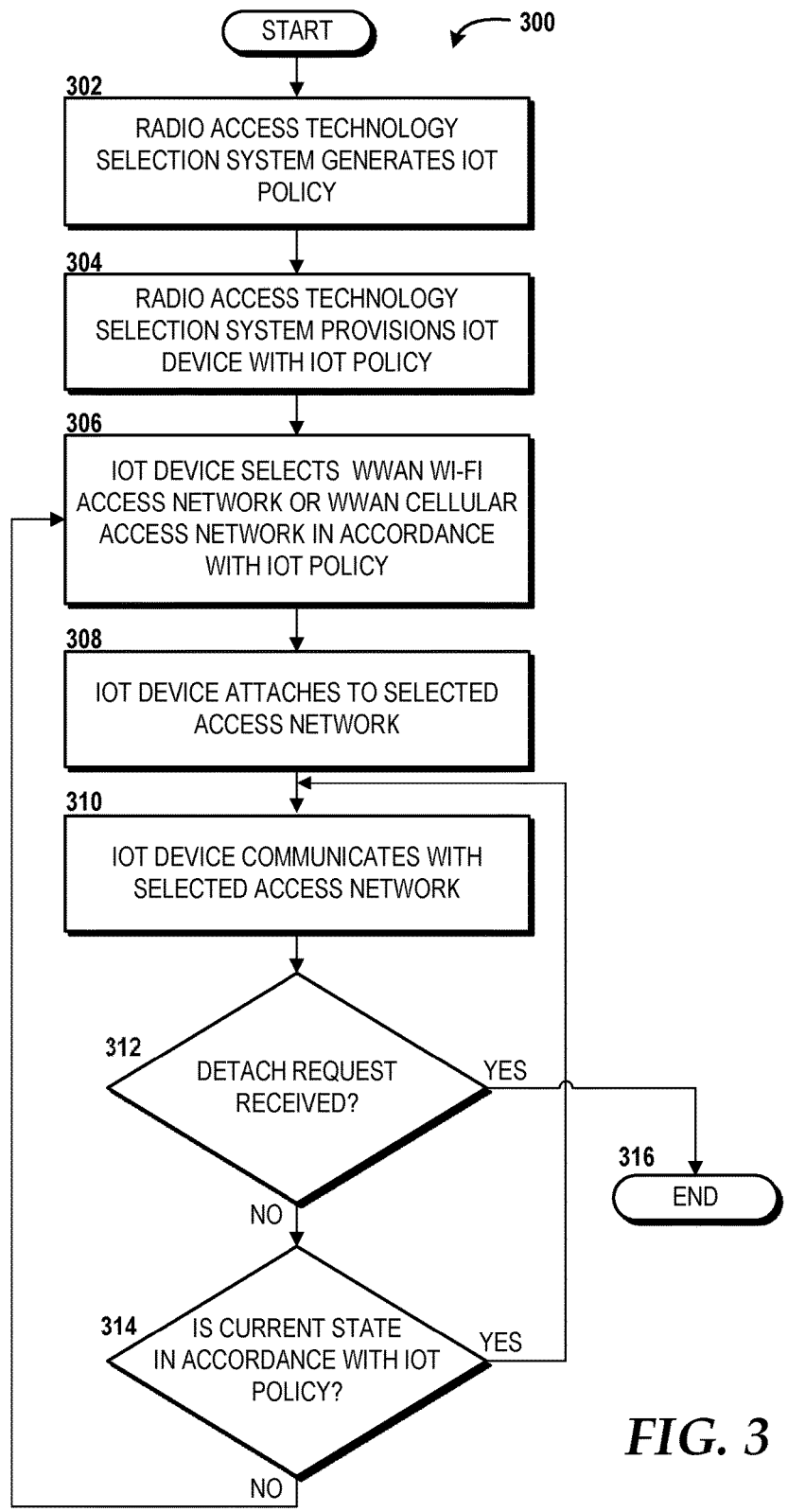
FIG. 3 is a flow diagram illustrating aspects of a method for selecting an access network for an IoT device, according to an illustrative embodiment.

Turning now to FIG. 3, a flow diagram illustrating aspects of a method 300 for selecting an access network based, at least in part, upon one or more IoT policies, such as the IoT policies 114-114n, will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of the IoT device 102, the RAT selection system 116, and/or one or more other computing systems and/or devices disclosed herein to perform operations.

For purposes of illustrating and describing some of the concepts of the present disclosure, the method 300 is disclosed herein are described as being performed, in part, by the RAT selection system 116 and, in part, by the IoT device 102, via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 begins and proceeds to operation 302, where an ANDSF, such as the RAT selection system 116 generates/defines one or more IoT policies, such as the IoT policies 114-114n. From operation 302, the method 300 proceeds to operation 304, where the RAT selection system 116 provisions one or more IoT devices, such as the IoT device 102, with the IoT policies 114-114n. An example provisioning process can include over-the-air programming of the IoT device 102 to utilize the IoT policies 114-114n for network selection.

From operation 304, the method 300 proceeds to operation 306, where the IoT device 102 selects the WWAN WI-FI access network 104 or the WWAN cellular access network 106 in accordance with the IoT policy 114. From operation 306, the method 300 proceeds to operation 308, where the IoT device 102 attaches to the selected access network. From operation 308, the method 300 proceeds to operation 310, were the IoT device 102 communicates with the selected access network.

From operation 310, the method 300 proceeds to operation 312, where the IoT determines whether a detach request has been received. The detach request can be an internal request from an operating system, application, or other software component of the IoT device 102. Alternatively, the detach request can be received from an external source, such as by way of the core network 108, the WWAN WI-FI access network 104, or the WWAN cellular access network 106. If the IoT device 102 determines that a detach request has not been received, the method 300 proceeds to operation 314. If, however, the IoT device 102 determines that a detach request has been received, the method 300 proceeds to operation 316, where the method 300 ends.

At operation 314, the IoT device 102 determines whether a current state of the IoT device is in accordance with the IoT policy 114. For example, the IoT device 102 can determine whether the access network to which the IoT device 102 is connected remains appropriate for a current state of communication (i.e., the size, type, frequency of data transmission). If so, the method 300 returns to operation 310 described above. If not, the method 300 returns to operation 306.

Figure 4:
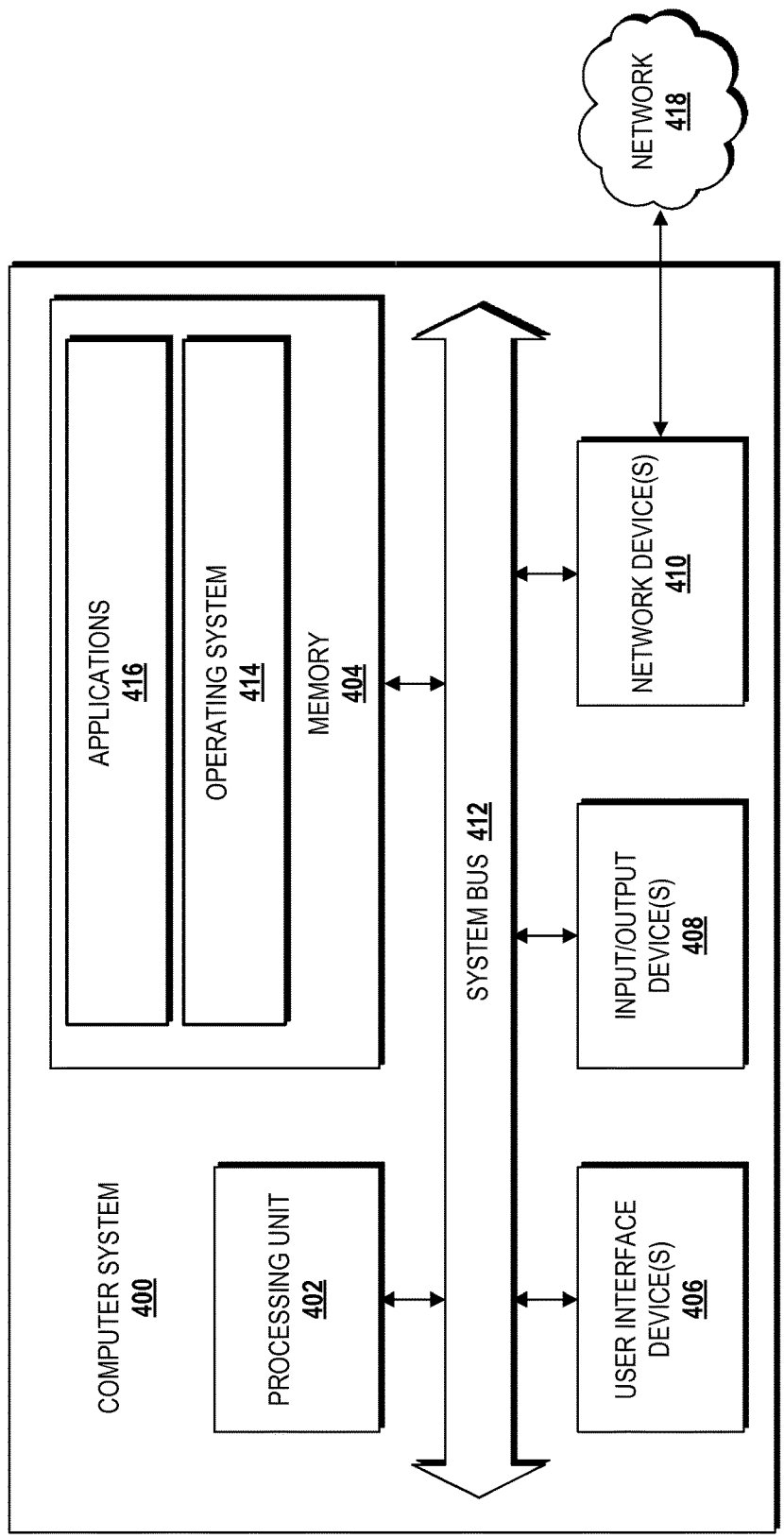
FIG. 4 is a block diagram illustrating an example computer system capable of implementing aspects of the embodiments presented herein.

FIG. 4 is a block diagram illustrating a computer system 400 configured to perform various operations disclosed herein. The computer system 400 includes a processing unit 402, a memory 404, one or more user interface devices 406, one or more input/output ("I/O") devices 408, and one or more network devices 410, each of which is operatively connected to a system bus 412. The system bus 412 enables bi-directional communication between the processing unit 402, the memory 404, the user interface devices 406, the I/O devices 408, and the network devices 410. In some embodiments, the IoT device(s) 102-102n, one or more components of the illustrated access networks, the IoT gateway 110, the RAT selection system 116, the IoT policy database 118, the subscription profile database 124, the IoT device profile database 126 is/are configured, at least in part, like the computer system 400. It should be understood, however, that the IoT device(s) 102-102n, one or more components of the illustrated access networks, the IoT gateway 110, the RAT selection system 116, the IoT policy database 118, the subscription profile database 124, the IoT device profile database 126 may include additional functionality or include less functionality than now described. Additional systems, such as servers that serve data from the IoT policy database 118, the subscription profile database 124, and/or the IoT device profile database 126 also may be configured, at least in part, like the computer system 400.

The processing unit 402 may be a standard central processor that performs arithmetic and logical operations, a more specific purpose programmable logic controller ("PLC"), a programmable gate array, or other type of processor known to those skilled in the art and suitable for controlling the operation of the computer system 400. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more applications 416.

The operating system 414 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 406 may include one or more devices with which a user accesses the computer system 400. The user interface devices 406 may include, but are not limited to, computers, servers, personal digital assistants, telephones (e.g., cellular, IP, or landline), or any suitable computing devices. The I/O devices 408 enable a user to interface with the program modules. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network devices 410 enable the computer system 400 to communicate with other networks or remote systems via a network 418. Examples of the network devices 410 include, but are not limited to, a modem, a radio frequency ("RF") or infrared ("IR") transceiver, a telephonic interface, a bridge, a router, or a network card. The network 418 may include a wireless network such as, but not limited to, a WLAN such as a WI-FI network, a WWAN, a wireless PAN ("WPAN") such as BLUETOOTH, or a wireless MAN ("WMAN"). Alternatively, the network 418 may be a wired network such as, but not limited to, a WAN such as the Internet, a LAN such as the Ethernet, a wired PAN, or a wired MAN.

The network 418 can be or can include the WWAN WI-FI access network 104, the WWAN cellular access network 106, the core network 108, or some combination thereof.

Figure 5:
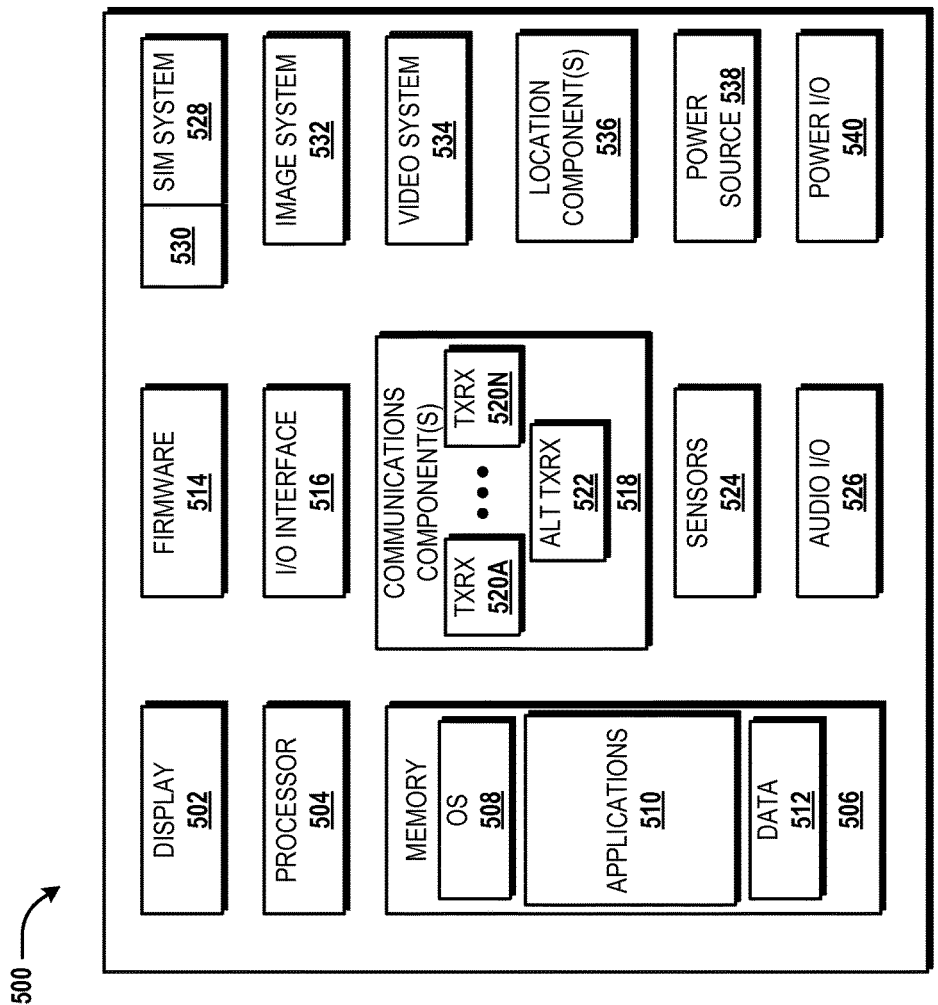
FIG. 5 is a block diagram illustrating an example IoT device capable of implementing aspects of the embodiments disclosed herein.

Turning now to FIG. 5, an illustrative IoT device 500 and components thereof will be described. In some embodiments, the IoT devices 102-102n described above with reference to FIGS. 1 and 2 can be configured as and/or can have an architecture similar or identical to the IoT device 500 described herein in FIG. 5. It should be understood, however, that the IoT devices 102-102n may or may not include the functionality described herein with reference to FIG. 5. While connections are not shown between the various components illustrated in FIG. 5, it should be understood that some, none, or all of the components illustrated in FIG. 5 can be configured to interact with one another to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the IoT device 500 can include a display 502 for displaying data. According to various embodiments, the display 502 can be configured to display network connection information, various graphical user interface ("GUI") elements, text, images, video, virtual keypads and/or keyboards, messaging data, notification messages, metadata, Internet content, device status, time, date, calendar data, device preferences, map and location data, combinations thereof, and/or the like. The IoT device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, which may include the policy application engine 202, the network connection manager 204, other computer-executable instructions stored in the memory 506, or the like. In some embodiments, the applications 510 also can include a UI application (not illustrated in FIG. 5).

The UI application can interface with the operating system 508, such as the operating system 200 shown in FIG. 2, to facilitate user interaction with functionality and/or data stored at the IoT device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in data communications, entering/deleting data, entering and setting user IDs and passwords for device access, configuring settings, manipulating content and/or settings, multimode interaction, interacting with other applications 510, and otherwise facilitating user interaction with the operating system 508, the applications 510, and/or other types or instances of data 512 that can be stored at the IoT device 500. The data 512 can include, for example, the IoT device preferred rule(s) 208, the IoT policies 114-114n, subscription profile data, IoT device data, and/or other data.

According to various embodiments, the applications 510 can include, for example, any IoT applications, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The IoT device 500 also can include an input/output ("I/O") interface 516. The I/O interface 516 can be configured to support the input/output of data such as location information, presence status information, user IDs, passwords, and application initiation (start-up) requests. In some embodiments, the I/O interface 516 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the IoT device 500 can be configured to synchronize with another device to transfer content to and/or from the IoT device 500. In some embodiments, the IoT device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the IoT device 500 and a network device or local device.

The IoT device 500 also can include a communications component 518. The communications component 518 can be configured to interface with the processor 504 to facilitate wired and/or wireless communications with one or more networks such as the access networks described herein. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using GSM, CDMAONE, CDMA2000, LTE, and various other 2G, 2.5G, 3G, 4G, 4.5G, and greater generation technology standards. Moreover, the communications component 518 may facilitate communications over various channel access methods (which may or may not be used by the aforementioned standards) including, but not limited to, TDMA, FDMA, W-CDMA, OFDM, SDMA, and the like.

In addition, the communications component 518 may facilitate data communications using GPRS, EDGE, the HSPA protocol family including HSDPA, EUL or otherwise termed HSUPA, HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The IoT device 500 also can include one or more sensors 524. The sensors 524 can include temperature sensors, light sensors, air quality sensors, movement sensors, accelerometers, magnetometers, gyroscopes, infrared sensors, orientation sensors, noise sensors, microphones proximity sensors, combinations thereof, and/or the like for use in collecting IoT data. Additionally, audio capabilities for the IoT device 500 may be provided by an audio I/O component 526. The audio I/O component 526 of the IoT device 500 can include one or more speakers for the output of audio signals, one or more microphones for the collection and/or input of audio signals, and/or other audio input and/or output devices.

The illustrated IoT device 500 also can include a subscriber identity module ("SIM") system 525. The SIM system 525 can include a universal SIM ("USIM"), a universal integrated circuit card ("UICC") and/or other identity devices. The SIM system 525 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the IoT device 500 are contemplated, it should be understood that these embodiments are illustrative, and should not be construed as being limiting in any way.

The IoT device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The IoT device 500 may also include a video system 534. The video system 534 can be configured to capture, process, record, modify, and/or store video content. Photos and videos obtained using the image system 532 and the video system 534, respectively, may be added as message content to an MMS message, email message, and sent to another IoT device. The video and/or photo content also can be shared with other devices via various types of data transfers via wired and/or wireless communication devices as described herein.

The IoT device 500 also can include one or more location components 536. The location components 536 can be configured to send and/or receive signals to determine a geographic location of the IoT device 500. According to various embodiments, the location components 536 can send and/or receive signals from global positioning system ("GPS") devices, assisted-GPS ("A-GPS") devices, WI-FI/ WIMAX and/or cellular network triangulation data, combinations thereof, and the like. The location component 536 also can be configured to communicate with the communications component 518 to retrieve triangulation data for determining a location of the IoT device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the IoT device 500. Using the location component 536, the IoT device 500 can generate and/or receive data to identify its geographic location, or to transmit data used by other devices to determine the location of the IoT device 500. The location component 536 may include multiple components for determining the location and/or orientation of the IoT device 500.

The illustrated IoT device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the IoT device 500 can include additional and/or alternative components, the above embodiment should be understood as being illustrative of one possible operating environment for various embodiments of the concepts and technologies described herein. The described embodiment of the IoT device 500 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the IoT device 500 or other devices or computers described herein, such as the computer system 500 described above with reference to FIG. 5. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the IoT device 500 in order to store and execute the software components presented herein. It is also contemplated that the IoT device 500 may not include all of the components shown in FIG. 5, may include other components that are not explicitly shown in FIG. 5, or may utilize an architecture completely different than that shown in FIG. 5.

Figure 6:
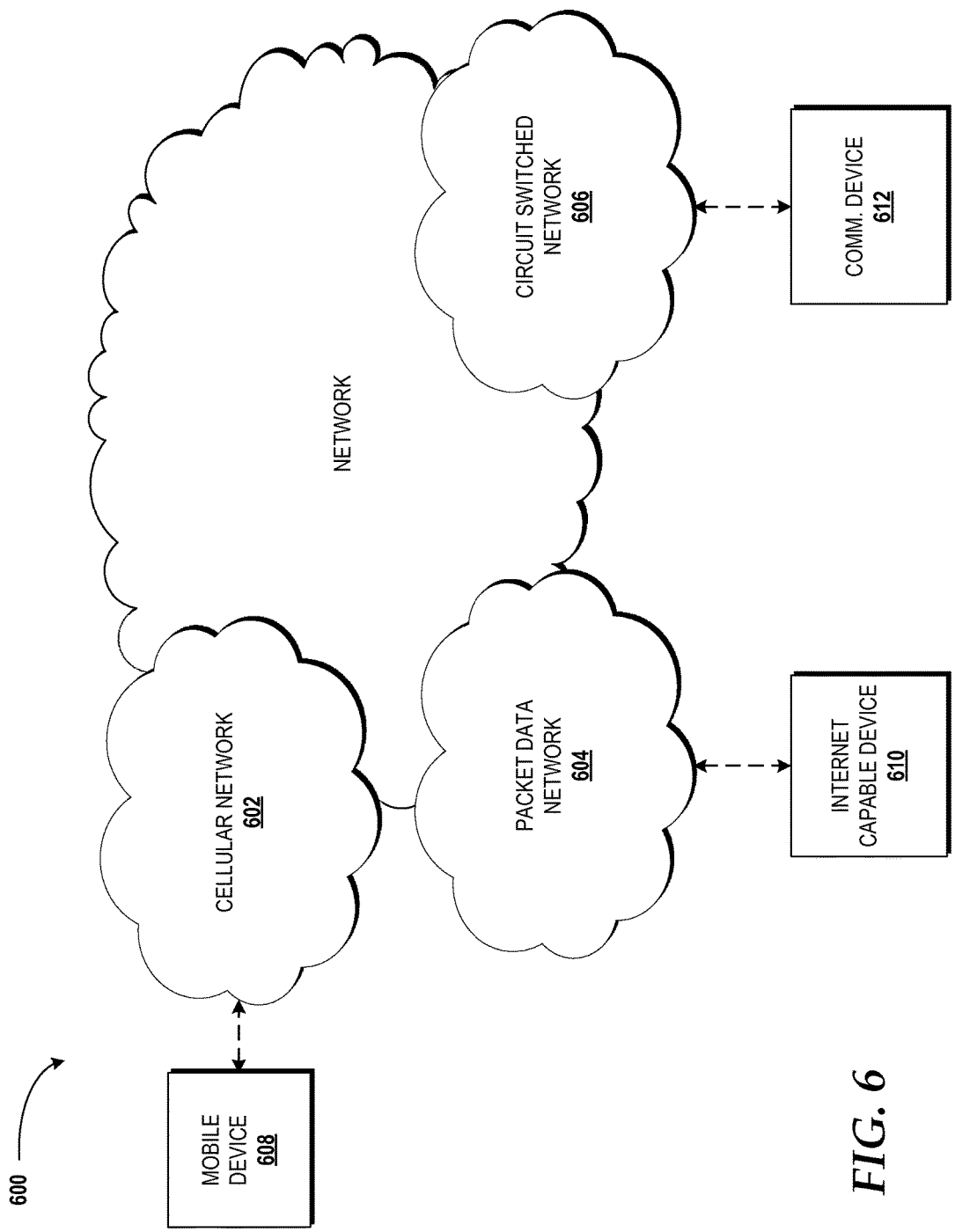
FIG. 6 is a diagram illustrating a network, according to an illustrative embodiment.

Turning now to FIG. 6, details of a network 600 are illustrated, according to an illustrative embodiment. The network 600 includes a cellular network 602, a packet data network 604, for example, a WI-FI network and/or the Internet, and a circuit switched network 606, for example, a PSTN. The network 600 can include the operating environment 100 illustrated and described with reference to FIG. 1.

The cellular network 602 includes various components such as, but not limited to, BTSs, Node-B's or e-Node-B's, base station controllers ("BSCs"), radio network controllers ("RNCs"), mobile switching centers ("MSCs"), mobile management entities ("MMEs"), SMSCs, multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 602 also includes radios and nodes for receiving and transmitting voice, data, and combinations thereof to and from radio transceivers, networks, the packet data network 604, and the circuit switched network 606. The cellular network 602 can include the WWAN cellular access network 106. For embodiments in which components of the WWAN WI-FI access network 104 and the WWAN cellular access network 106 are collocated, the cellular network 602 an include both the WWAN WI-FI access network 104 and the WWAN cellular access network 106

A mobile communications device 606, such as, for example, a cellular telephone, a user equipment, a mobile terminal, a PDA, a laptop computer, a handheld computer, the IoT device 102, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards such as LTE, or the like, as well as evolved and future mobile standards.

The packet data network 604 can include the WWAN WI-FI access network 104 and the PDNs 112-112n. The packet data network 604 includes various devices, for example, servers, computers, databases, and other devices in communication with one another, as is generally known. In some embodiments, the packet data network 604 is or includes one or more WI-FI networks, each of which can include one or more WI-FI access points, routers, switches, and other WI-FI network components. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a POTS. The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, the IoT device 102, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610.

Based on the foregoing, it should be appreciated that concepts and technologies for WI-FI and cellular interworking for IoT devices have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

I claim:

1. A radio access technology selection system comprising:
a processor; and
memory that stores computer-executable instructions that, when executed by the processor, cause the processor to perform operations comprising
generating a policy for network selection and traffic routing, wherein the policy comprises network selection criteria for a dual-mode internet of things device, wherein the network selection criteria for the dual-mode internet of things device is defined in an internet of things device specific management object of an access network discovery and selection function management object tree, wherein the access network discovery and selection function management object tree comprises a plurality of management objects, and wherein the plurality of management objects comprises the internet of things device specific management object and a mobile device specific management object, and
provisioning, based upon the internet of things device specific management object, the policy for the dual-mode internet of things device, wherein the dual-mode internet of things device utilizes the network selection criteria for the dual-mode internet of things device to select an access network.

2. The radio access technology selection system of claim 1, wherein the radio access technology selection system comprises an access network discovery and selection function.

3. The radio access technology selection system of claim 1, wherein the internet of things device specific management object of the access network discovery and selection function management object tree is provisioned with a WI-FI network identifier that identifies a WI-FI access network.

4. The radio access technology selection system of claim 3, wherein the WI-FI network identifier identifies the WI-FI access network as an internet of things WI-FI network connected to an internet of things gateway operating in a core network.

5. The radio access technology selection system of claim 4, wherein the internet of things WI-FI network operates in accordance with IEEE 802.11ah, IEEE 802.11af, or IEEE 802.11ah and IEEE 802.11af.

6. The radio access technology selection system of claim 4, wherein the internet of things device specific management object of the access network discovery and selection function management object tree is further provisioned with an access point name that identifies a packet data network that the dual-mode internet of things device should connect to via the WI-FI access network.

7. A computer-readable storage medium comprising computer-readable instructions that, when executed by a processor of a radio access technology selection system, cause the radio access technology selection system to perform operation comprising:
generating a policy for network selection and traffic routing, wherein the policy comprises network selection criteria for a dual-mode internet of things device, wherein the network selection criteria for the dual-mode internet of things device is defined in an internet of things device specific management object of an access network discovery and selection function management object tree, wherein the access network discovery and selection function management object tree comprises a plurality of management objects, and wherein the plurality of management objects comprises the internet of things device specific management object and a mobile device specific management object is defined specifically for a network selection criteria of internet of things devices, and
provisioning, based upon the internet of things device specific management object, the policy for the dual-mode internet of things device, wherein the dual-mode internet of things device utilizes the network selection criteria for the dual-mode internet of things device to select an access network.

8. The computer-readable storage medium of claim 7, wherein the radio access technology selection system comprises an access network discovery and selection function.

9. The computer-readable storage medium of claim 7, wherein the internet of things device specific management object of the access network discovery and selection function management object tree is provisioned with a WI-FI network identifier that identifies a WI-FI access network.

10. The computer-readable storage medium of claim 9, wherein the WI-FI network identifier identifies the WI-FI access network as an internet of things WI-FI network connected to an internet of things gateway operating in a core network.

11. The computer-readable storage medium of claim 10, wherein the internet of things WI-FI network operates in accordance with IEEE 802.11ah, IEEE 802.11af, or IEEE 802.11ah and IEEE 802.11af.

12. The computer-readable storage medium of claim 10, wherein the internet of things device specific management object of the access network discovery and selection function management object tree is further provisioned with an access point name that identifies a packet data network that the dual-mode internet of things device should connect to via the WI-FI access network.

13. A method comprising:
generating, by a radio access technology selection system, a policy for network selection and traffic routing, wherein the policy comprises network selection criteria for a dual-mode internet of things device, wherein the network selection criteria for the dual-mode internet of things device is defined in an internet of things device specific management object of an access network discovery and selection function management object tree, wherein the access network discovery and selection function management object tree comprises a plurality of management objects, and wherein the plurality of management objects comprises the internet of things device specific management object and a mobile device specific management object; and
provisioning, by the radio access technology selection system, based upon the internet of things specific management object, the policy for the dual-mode internet of things device, wherein the dual-mode internet of things device utilizes the network selection criteria for the dual-mode internet of things device to select an access network.

14. The method of claim 13, wherein the radio access technology selection system comprises an access network discovery and selection function.

15. The method of claim 13, wherein the internet of things device specific management object of the access network discovery and selection function management object tree is provisioned with a WI-FI network identifier that identifies a WI-FI access network.

16. The method of claim 15, wherein the WI-FI network identifier identifies the WI-FI access network as an internet of things WI-FI network connected to an internet of things gateway operating in a core network.

17. The method of claim 16, wherein the internet of things WI-FI network operates in accordance with IEEE 802.11ah, IEEE 802.11af, or IEEE 802.11ah and IEEE 802.11af.

18. The method of claim 16, wherein the internet of things device specific management object of the access network discovery and selection function management object tree is further provisioned with an access point name that identifies a packet data network that the dual-mode internet of things device should connect to via the WI-FI access network.

\* \* \* \* \*